Figure 1:
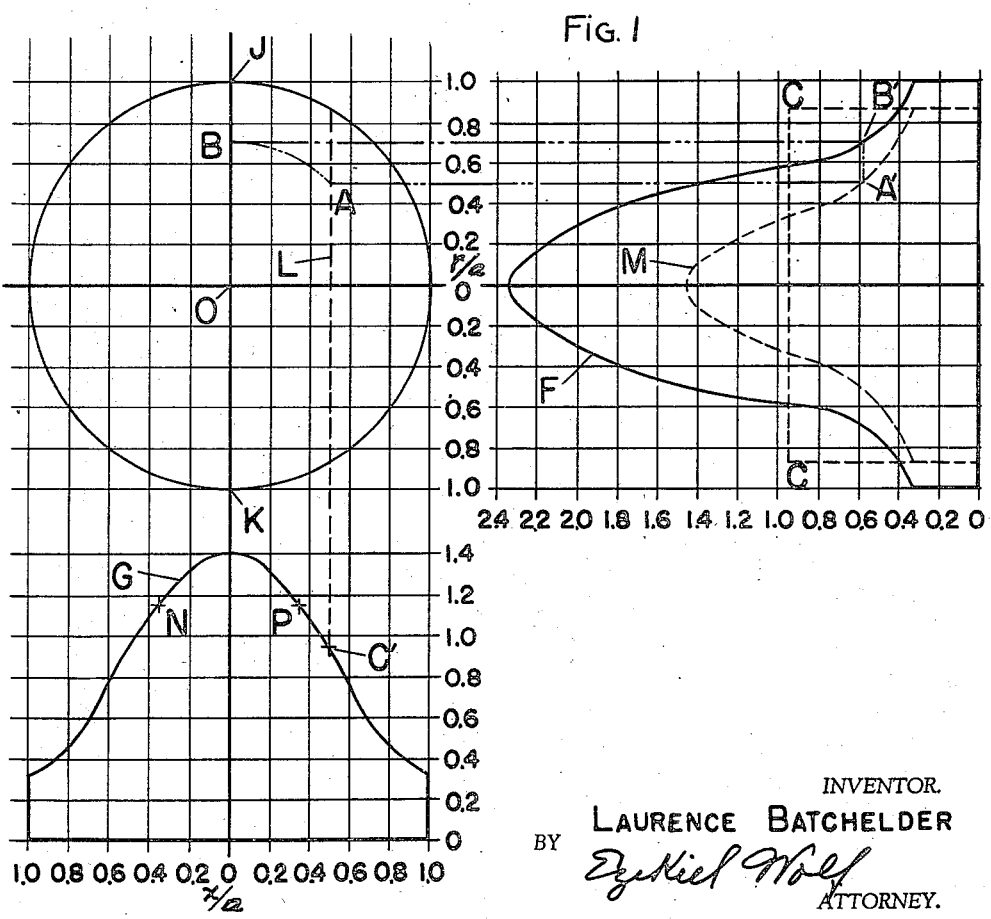

Sept. 10, 1946.   L. BATCHELDER   2,407,244
APPARATUS FOR SUBMARINE SIGNALING
Filed Aug. 2, 1939   2 Sheets-Sheet 1

INVENTOR.
LAURENCE BATCHELDER
BY
ATTORNEY.

INVENTOR.
LAURENCE BATCHELDER

Patented Sept. 10, 1946

2,407,244

UNITED STATES PATENT OFFICE 2,407,244

APPARATUS FOR SUBMARINE SIGNALING

Laurence Batchelder, Cambridge, Mass., assignor, by mesne assignments, to Submarine Signal Company, Boston, Mass., a corporation of Maine Application August 2, 1939, Serial No. 287,974

6 Claims. (Cl. 177—386)

The present invention relates to translating devices for converting compressional wave energy to electrical energy, and vice versa. More particularly the present invention relates to such devices as used for signaling under water and is particularly concerned with the transmission and reception of compressional wave energy in a beam.

It has heretofore generally been understood that if a vibratable piston be made large in its dimensions in comparison with the wave length of the compressional waves at the signaling frequency, a concentration of energy along the axis perpendicular to the radiating surface will be obtained. However, such a concentration of energy in a main beam is accompanied by smaller concentrations of energy in directions at various angles with the axis of the main beam.

When the relative acoustic energy intensities in the free medium as produced by a sending device at a constant distance large compared to the dimensions of the device are plotted with respect to the angular directions from the axis perpendicular to the radiating surface, as on polar coordinate graph paper, the main concentration of energy will appear as a large lobe representing the main beam, and a plurality of auxiliary lobes or ears representing the subsidiary energy concentrations in directions other than that of the main beam will also appear. These auxiliary lobes of the beam pattern are often objectionable particularly for signaling under water as in acoustic echo ranging for the determination of the distance and direction of remote objects. Such subsidiary energy concentrations can be reduced by not driving the plane radiating surface as a piston but by driving it at varying amplitudes over its surface.

It has been shown in the copending application of Harold M. Hart, Serial No. 285,902, filed July 22, 1939, that a good beam pattern with a main beam narrow enough to produce a good directional effect and with the subsidiary maxima reduced to a very small value can be obtained by giving a circular radiating surface an amplitude varying in accordance with the following equation:

$$\frac{A_r}{A_0} = 1 - \frac{12}{7}\left(\frac{r}{a}\right)^2 + \frac{6}{7}\left(\frac{r}{a}\right)^4 \tag{1}$$

where $A_r$ represents the amplitude at any radial coordinate measured from the center of the radiating surface; $A_0$ is the amplitude at the center of the radiating surface; $r$ is the radial distance of any point from the center of the radiating surface; and $a$ is the maximum radius of the radiating surface. This equation can also be written:

$$\frac{A_r}{A_{av}} = \frac{7}{3} - 4\left(\frac{r}{a}\right)^2 + 2\left(\frac{r}{a}\right)^4 \tag{2}$$

where $A_{av}$ is the average amplitude of the surface. This amplitude distribution is symmetrical with respect to the center of the radiating surface and the maximum vibrational amplitude occurs at the center.

According to one feature of the present invention the amplitude distribution over the surface of a circular radiating surface is not made symmetrical about the center but is made symmetrical about a diameter. By this means more energy can be radiated into the medium, better efficiency can be obtained and for echo ranging purposes the noise level can be reduced.

Figure 2:
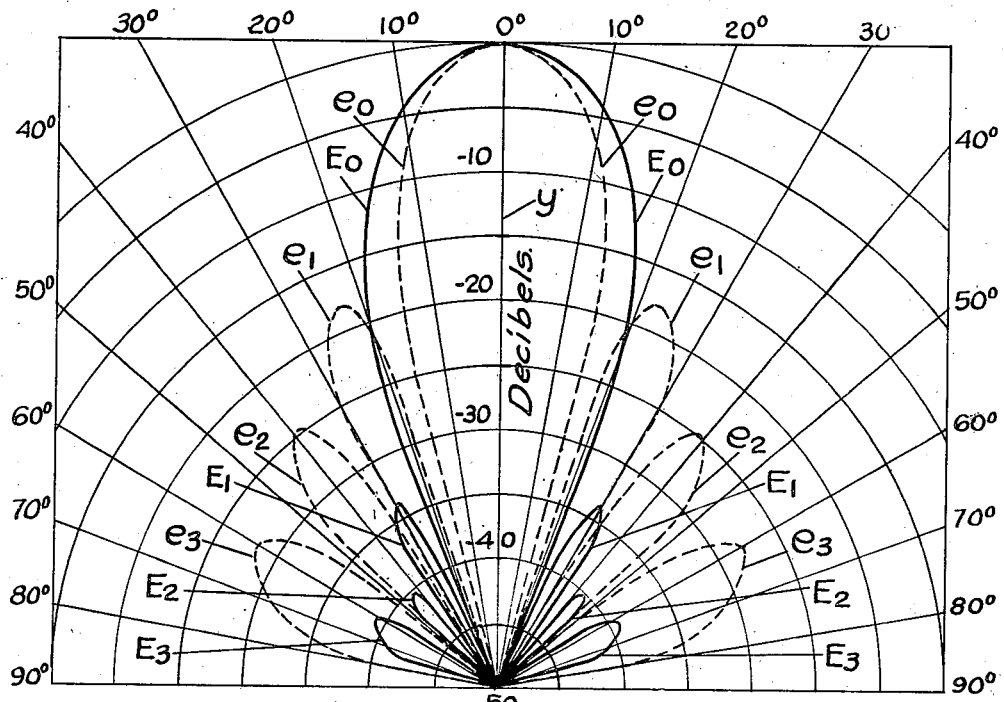
Figure 3:
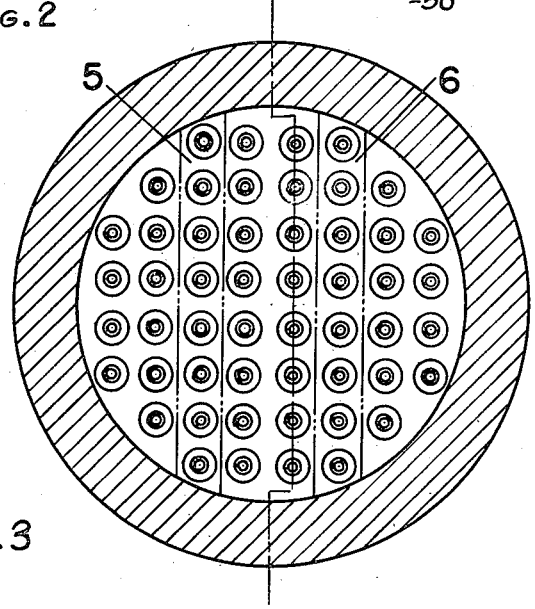
Figure 4:
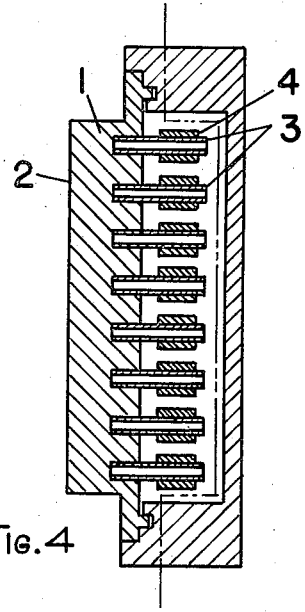

These and other features and objects of the present invention will more fully appear and best be understood from the following description taken in connection with the accompanying drawings in which Fig. 1 is a graphical illustration of amplitude distributions and other features of the present invention; Fig. 2 is a polar diagram of certain beam patterns; Fig. 3 is a horizontal section of a magnetostriction oscillator; Fig. 4 is a vertical section of the oscillator shown in Fig. 3.

If a circular plane radiating surface having a diameter greater than the wave length of the signaling frequency be vibrated with an amplitude uniform over its surface, a beam pattern in the medium will be obtained similar to that shown by the dotted curve in Fig. 2. This curve shows the relative compressional wave intensities in a plane perpendicular to the radiating surface at a constant distance from the surface large compared to the surface dimensions. The curve shows a maximum energy concentration along an axis $y$ perpendicular to the radiating surface which is assumed to have no rear radiation in the medium. At some angles from the axis $y$ the energy decreases as indicated by the dotted line $e_0$. At some larger angle from the axis $y$ the radiated energy will fall to zero, and at a still greater angle again build up to a lower but still significant maximum value, then again fall to zero as the angle is further increased, and so on throughout the hemisphere facing the radiating piston. Thus, there will appear successive lobes of energy concentration at various angular distances from the axis $y$ as indicated in Fig. 2 by the lobes $e_1$, $e_2$ and $e_3$ of the beam pattern diagram. Where the radiating surface is circular, it will be understood that these subsidiary lobes are in the form of hollow cones so that the beam pattern graph in any plane perpendicular to the radiating surface will be the same as that shown in Fig. 2. Since the large subsidiary maxima $e_1$, $e_2$ and $e_3$ are often objectionable, particularly for echo ranging purposes, the radiating surface may be given a non-uniform amplitude which, if suitably chosen, will reduce these subsidiary maxima. If the radiating surface be vibrated with an amplitude distribution like that determined by Equation 2 above, the beam pattern represented by the solid curve in Fig. 2 will be obtained. The main lobe $E_0$ representing the main beam has a somewhat greater width than the main lobe $e_0$ produced by uniform amplitude of the radiating surface but the auxiliary lobes $E_1$, $E_2$ and $E_3$ are very much reduced in intensity.

One form of device which may be used to obtain the beam patterns of Fig. 2 is shown in Figs. 3 and 4. In this device a radiating member 1 having a radiating surface 2 adapted to contact the signaling medium—for example, water—has a plurality of magnetostriction tubes 3 firmly fixed to its inner surface. Each of the tubes 3 is driven by an electromagnetic coil 4 which surrounds it. While only relatively few nickel tubes have been shown, it will be understood that in practice a great many tubes may be used, often as many as several hundred. Each of the tubes together with its associated portion of the member 1 forms a one-half wave length vibrating system. When the coils of all the tubes have the same number of turns and are excited with the same current, that is have the same number of ampere turns, substantially uniform piston vibration of the surface tube is obtained. On the other hand, when the coil surrounding the tubes nearest the center of the element 1 are given a greater number of ampere turns than the coils surrounding the tubes nearer the edge of the member 1, the surface 2 will have a greater amplitude at the center. If the ampere turns for the coils from center to edge of the radiating member be varied in accordance with Equation 1 above, a beam pattern substantially like that of the solid curve in Fig. 2 will be obtained. Such an amplitude distribution is generally obtained in practice by grouping the several coils in circular groups or substantially circular groups, all the coils in each group being given the same number of ampere turns. Such circular symmetry involves a rather complicated coil construction which can be considerably simplified in accordance with the present invention in which the amplitude distribution is made symmetrical about a diameter of the radiating member.

If it be assumed that the beam pattern represented by the solid curve in Fig. 2 is desired in one plane, the proper amplitude distribution for the circular radiating surface, symmetrical about the diameter perpendicular to the said plane is $$\frac{A_x}{A_{av}} = \frac{7}{5} - \frac{32}{15}\left(\frac{x}{a}\right)^2 + \frac{16}{15}\left(\frac{x}{a}\right)^4 \qquad (3)$$

where $A_x$ is the amplitude of any chord parallel to the diameter of symmetry, $A_{av}$ is the average amplitude, $x$ is the radial distance of the chord from the diameter of symmetry and $a$ is the total radius of the radiating surface. This amplitude distribution can be obtained by calculation or by the method shown graphically in Fig. 1.

The curve F in Fig. 1 shows the amplitude distribution over the radiating surface in accordance with Equation 2 above plotted with respect to the average amplitude of the surface. Thus, the center of the radiating surface is given an amplitude 2.33 times that of the average while the edge of the surface is vibrated with an amplitude of 0.33 times the average. This amplitude distribution is the same for all diameters. The curve F, therefore, can be deemed to represent the outline of a solid figure symmetrical about its axis.

To produce the same beam pattern in one plane I vary the amplitude of the radiating surface symmetrically with respect to the diameter perpendicular to that plane in accordance with Equation 3 plotted in Fig. 1 as the curve G; that is all portions of the radiating surface lying in a chord parallel to the diameter are given the same amplitude, the amplitude for the various chords decreasing from the diameter outwards. Thus, in curve G the abscissae represent the perpendicular distances $x$ of the several chords from the diameter relative to the total radius of the radiating surface, and the ordinates represent the amplitude of each chord relative to the average amplitude. The amplitude at each chord is the average of the various amplitudes which the several portions of the chord would have if the radiating surface were excited with an amplitude distribution in accordance with the curve F circularly symmetrical about the center. Thus, at the diameter the radiating surface is given an amplitude of 1.4 whereas at the chord farthest removed from the diameter, the amplitude is 0.33. The curve G can be obtained from the curve F in the following manner.

Let the circle H represent the radiating surface having a vertical diameter JK about which the amplitude distribution is to be symmetrical to produce a beam pattern in the horizontal plane similar to that shown by the solid curve in Fig. 2. Then assume, for example, that it is desired to obtain the surface amplitude at the chord represented by the dotted line L. Since this amplitude is to be the average of the amplitude which would occur along this chord for circularly symmetrical amplitude distribution, it is first necessary to determine what amplitude the various points on this chord would have for circularly symmetrical amplitude distribution. Take any point A on the chord at a distance OB from the center of the radiating surface. The amplitude of such points for circular symmetry is found from the curve F to be at B'. This amplitude may then be plotted as the point A'. Similarly, for other points on the chord L the amplitude can be determined which such points would have for circular symmetrical amplitude distribution whereby the curve M is obtained. Averaging all the amplitudes represented by the curve M gives the average amplitude represented by the line CC which for the particular chord chosen will be seen to lie at approximately 0.95 of the total average amplitude of the radiating surface. Transferring this point to a new graph the point C' of the curve G is obtained. By making similar graphical constructions for other chords of the radiating surface the curve G will be obtained. As before stated, this curve gives the amplitude of successive elemental strips of the radiating surface parallel to a diameter.

In practice with, for example, a device of the type shown in Figs. 3 and 4 a close approximation to this amplitude distribution can be obtained by dividing the driving elements into vertical rows symmetrical about the vertical diameter and giving the coils in each row the same number of ampere turns and those in successive rows the ampere turns indicated by the relative desired vibrational amplitudes as determined from the curve G. Thus the two rows of coils 5 and 6 which are at the distance $0.35/a$ from the diameter will be given the amplitude indicated by the points N and P on the curve G. With this amplitude distribution the device will produce a beam pattern in the horizontal plane similar to that of the solid curve shown in Fig. 2. In other planes the beam pattern will, of course, vary, the subsidiary maxima becoming greater.

It will be noted from a comparison of the curve G with the curve F that the maximum amplitude of any point on the radiating surface, that is the amplitude along the vertical diameter, is considerably less than the maximum amplitude required for circularly symmetrical amplitude distribution. This means that the peak amplitude is nearer the average amplitude for diametral symmetry. By the latter arrangement, therefore, more energy can be radiated into the water, for the peak amplitude is always limited by the amplitude at which cavitation takes place. Moreover, with diametrical symmetry better efficiency is obtained because the different portions of the radiating surface are working more nearly at the same amplitude. The construction of the device is also simpler in the case particularly of an oscillator of the type shown in Figs. 3 and 4 where the radiating surface is driven by a great many individual elements distributed over it.

Having now described my invention, I claim:

1. A compressional wave sending and/or receiving device having a circular radiating and/or receiving surface of diameter larger than the wave length of the compressional waves in the signaling medium at the signaling frequency and means when sending for vibrating said surface and when receiving for producing electrical response to motion of the surface, said vibrations and said response having an amplitude uniform along any chord parallel to a diameter of the surface but varying along any line perpendicular to said diameter, said amplitude variation being symmetrical with respect to said diameter.

2. A compressional wave sending and/or receiving device having a circular radiating and/or receiving surface of diameter larger than the wave length of the compressional waves in the signaling medium at the signaling frequency and means when sending for vibrating said surface and when receiving for producing electrical response to motion of the surface, said vibrations and said response having an amplitude uniform along any chord parallel to a diameter of the surface but varying along any line perpendicular to said diameter, said amplitude variation being symmetrical with respect to said diameter and being greatest at said diameter and least at parallel chords farthest removed from said diameter.

3. A compressional wave sending and/or receiving device having a circular radiating and/or receiving surface of diameter larger than the wave length of the compressional waves in the signaling medium at the signaling frequency and means when sending for vibrating said surface and when receiving for producing electrical response to motion of the surface, said vibrations and said response having an amplitude uniform along any chord parallel to a diameter of the surface but varying along any line perpendicular to said diameter, said amplitude variation being symmetrical with respect to said diameter and being greatest at said diameter and varying on each side thereof substantially in accordance with the equation $$\frac{A_x}{A_{av}} = \frac{7}{5} - \frac{32}{15}\left(\frac{x}{a}\right)^2 + \frac{16}{15}\left(\frac{x}{a}\right)^4$$

where, for sending, $A_x$ is the amplitude of the surface at any chord parallel to the diameter of symmetry, $A_{av}$ is the average amplitude of the whole surface, $x$ is the distance of the chord from the diameter and $a$ is the total radius of the diaphragm, and where, for receiving, $A_x$ is the response at said chord parallel to the diameter of symmetry, $A_{av}$ is the average response of said means over the whole surface, $x$ is the distance of the chord from the diameter and $a$ is the total radius of the diaphragm.

4. A compressional wave sending and/or receiving device having a circular radiating and/or receiving surface of diameter larger than the wave length in the signaling medium at the signaling frequency and a plurality of driving and/or receiving elements associated with various portions of said surface, said elements being arranged for sending to vibrate said surface and for receiving to respond to motion of said surface by said waves, said vibration and said response having an amplitude uniform along any chord parallel to a diameter but varying along any line perpendicular to said diameter, said amplitude variation being symmetrical with respect to the diameter.

5. A compressional wave sending and/or receiving device having a single radiating and/or receiving surface and driving and/or receiving means associated with various portions of the surface, said means being arranged to vibrate the surface and upon motion of the surface to produce electrical response, said vibration and said response varying symmetrically with respect to a center line about which the surface is symmetrical, and being uniform in directions parallel to said line but decreasing in directions perpendicular to said line.

6. A compressional wave sending and/or receiving device having a radiating and/or receiving surface of diameter larger than the wave length in the signaling medium at the signaling frequency and a plurality of driving and/or receiving elements associated with various portions of said surface, said elements being arranged for sending to vibrate said surface and for receiving to respond to motion of said surface, said vibrations and said response having amplitudes which are uniform in directions parallel to a line of symmetry of said surface but having varying amplitudes in directions at right angles to said line of symmetry.

LAURENCE BATCHELDER.